Nov. 2, 1937.   G. H. MAGEE   2,097,463
GAS GENERATING SYSTEM
Filed May 31, 1930
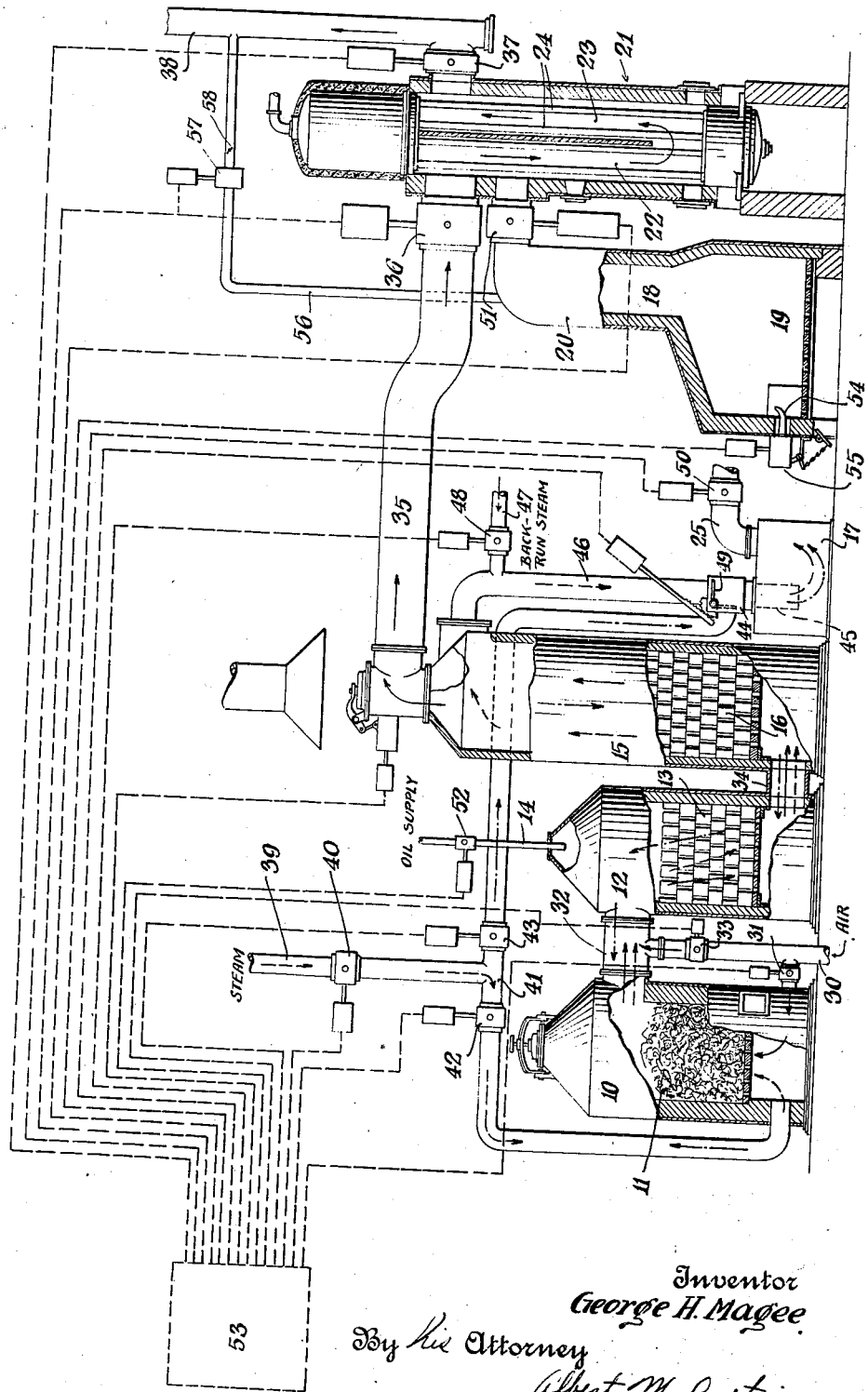
Inventor
George H. Magee
By his Attorney
Albert M. Austin Patented Nov. 2, 1937

2,097,463

UNITED STATES PATENT OFFICE 2,097,463

GAS GENERATING SYSTEM

George H. Magee, Nutley, N. J.

Application May 31, 1930, Serial No. 458,674

1 Claim. (Cl. 48—204)

The invention relates in general to waste heat apparatus, and more particularly to an arrangement for supplying heat continuously to a waste heat boiler of a gas generating plant.

According to the invention an auxiliary furnace is provided to heat the waste heat boiler of a gas plant during the periods during which no heat is received from the gas generating apparatus. The gas plant may be of the type having a water gas generator, a carburetor and a super-heater. During the "blow" period air may be blown through the gas generator to thoroughly ignite the fuel therein and to bring the checker work in the carburetor and super-heater to a high temperature, the waste gases then being used to generate steam in the waste heat boiler. After a given interval the air blast is removed and steam is blown through the charge of fuel in the gas generator and through the carburetor and super-heater to form the gaseous product which is then led to a relief holder for the gas. During this period, which may be called the generating or run period, the waste heat boiler receives no heat from the gas generating apparatus. According to the invention an auxiliary furnace is provided which is operated to generate heat only when no heat is being received by the waste heat boiler from the gas generating apparatus. The several valves for controlling the cycle may be hand operated or may be automatically controlled from a central station.

The invention also consists in certain new and original features of construction and operation hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which The single figure represents diagrammatically a gas plant according to the invention.

In the following description and in the claims parts will be identified by specific names for convenience, but they are intended to be as generic in their application to similar parts as the art will permit.

In the drawing accompanying and forming a part of this specification a practical commercial embodiment of the invention is disclosed, but as such illustration is primarily for purposes of disclosure, it will be understood that the structure and process may be modified in various respects without departure from the broad spirit and scope of the invention as hereinafter defined and claimed.

Referring now to the drawing, the apparatus shown comprises a water gas generator 10 having a bed of fuel 11 which may be coke or coal. The apparatus further comprises a carburetor 12 having checker work 13 therein and having an oil inlet 14. The apparatus further comprises a super-heater 15 having checker work 16, a water seal 17 from which the generated gas is taken by pipe 25 to a relief gas holder (not shown). The apparatus further comprises an auxiliary furnace 18 having a combustion chamber 19 and a flue 20 leading to a waste heat boiler 21 having down passage 22 and up passage 23 with the boiler tubes 24.

For introducing air into the system a supply pipe 30 is provided having a branch leading into the bottom of the gas generator 10 through valve 31. Another branch of the supply pipe 30 leads to a pipe 32 through a valve 33. The pipe 32 opens into the top of the gas generator 10 and into the top of carburetor 12.

Pipe 34 connects the lower parts of carburetor 12 and super-heater 15, and a pipe 35 connects the super-heater 15 with the top of the down passage 22 of the waste heat boiler 21 through a valve 36. The gases leave the top of up passage 23 through a valve 37 passing into flue 38.

For supplying steam to the system a supply pipe 39 is provided leading through a valve 40 to a pipe 41. The pipe 41 leads through a branch having a valve 42 to the bottom of the gas generator 10. The pipe 41 has another branch which leads through a valve 43 to a three-way valve 44.

The three-way valve 44 has a pipe 45 extending into the water seal 17 and another pipe 46 leading into the top of super-heater 15. A second supply pipe 47 is provided for steam which communicates with pipe 46 through valve 48.

It will be understood that the three-way valve 44 may be of any desired construction. As illustrated, however, it includes a pivoted damper 49 which may be swung from the position shown in heavy lines to the position shown in dotted lines stopping pipe 46 or 41. A valve 50 is provided in pipe 25 leading to the relief holder. Furthermore, a valve 51 is provided in the flue 20 leading to the waste heat boiler. A valve 52 is provided in the oil supply line 14. A burner indicated by 54 is provided for heating the auxiliary furnace 18, this burner being supplied with suitable fuel such as tar or oil which is controlled by valve 55.

Under certain conditions it may be desirable to provide a vent 56 connecting the flue 20 to the flue 38 to insure continuous burning of the pilot when the valve 51 is closed during the air blow period. A control valve 57 and a damper 58 may be provided in the vent 56. The damper 58 will be set by hand to such position as will provide just sufficient draft to keep the pilot burning, and left in set position.

For controlling the various valves a central control valve nest or station indicated by 53 may be provided. Dotted lines are shown leading from the control valve 53 to the several operating valves to illustrate that these valves may be controlled from a central position. These valves may be controlled manually by remote control from the central position 53 or they may be controlled automatically by suitable apparatus located at the position 53. The dotted lines leading from the position 53 may illustrate pipes which control the several valves by air or water or they may illustrate wires controlling the valves electrically. The several valves may be of any suitable type known in the art for performing similar functions and may be water cooled if necessary.

The operation of the system may be as follows: A suitable bed of coke or coal 11 is ignited in the gas generator 10. The valve 31 is open with the valve 42 closed and air is blown upwardly through the fuel 11 to ignite the fuel and to generate hot gases which pass through pipe 32 where the gases may be mixed with air passing through valve 33 which is open. Valve 52 is closed and the hot gases pass downwardly through carburetor 12, through pipe 34, upwardly through super-heater 15, through pipe 35, through valve 36 which is open, down passage 22, up passage 23 through valve 37 which is open, and out through flue 38. These hot gases heat the checker work 13 and 16 to a high temperature and generate steam in the waste heat boiler 21. This period is called the blow period and may continue for about forty per cent of the entire cycle of events. In cases where the entire cycle of events extends for about 5 minutes, the duration of the blow period may be about 2 minutes. During the blow period the valve 57 is open and valve 51 is closed. The path of the air and combustion gases is indicated by the solid arrows.

After the expiration of the blow period valves 31 and 33 are closed as are also valves 36 and 57. Valves 40 and 42 are opened to admit steam into the bottom of the gas generator. The steam then passes upwardly through the fuel bed 11, through pipe 32 into carburetor 12. Valve 52 is in open position and oil is sprayed into the carburetor which unites with the product resulting from the passage of steam through the hot burning fuel bed. The gaseous product passes downwardly through the checker work 13, through pipe 34, upwardly through checker work 16, down through pipe 46, through three-way valve 44 whose damper is in a position shown in dotted lines, through the water seal 17, pipe 25, valve 50 which is open, into the relief holder (not shown). The passage of the steam and resulting generated gas is indicated by the dotted line arrows.

It will be understood that the steam in passing through the fuel is decomposed and unites with the products of combustion of the coal under the high temperature in the usual manner and with the oil spray in carburetor 12 to form a gas having the desired heat units and of the desired composition. It is obvious that the composition may be varied by varying the proportions of steam, fuel and oil. In fact the oil may be omitted entirely in some instances if the product known as blue water gas is desired.

During the period of steam blowing, which is known as the generating period, the fuel bed 11 may be considerably cooled, as is also the case with the checker work 13 and 16. If desired, in order to promote efficiency during the generating period, the steam passage may be changed. Valve 40 may be closed and valve 48 may be opened and back-run steam may be admitted into pipe 46. The three-way valve 44 is operated to move its damper 49 to the position shown in full lines and back-run steam, taking the passage denoted by the dot and dash arrows, passes down through checker work 16, through pipe 34, up through checker work 13, through pipe 32, down through fuel 11 and upwardly through the left branch of pipe 41, through valves 42 and 43 which are now open, down through the right branch of pipe 41, through three-way valve 44, through water seal 17, pipe 25, valve 50 and into the relief holder (not shown).

The period known as the generating period, during which steam is passed through the fuel, may take about sixty per cent of the entire cycle or say about three minutes in some instances. During this time it will be noted no heat from the gas generating apparatus is supplied to the waste heat boiler 21. If provision were not made to prevent this the waste heat boiler would cool off considerably and the evaporation of the water therein would fall off considerably, resulting in a much decreased output of steam.

Therefore, at the beginning of the generating period the valve 55 is opened to allow oil or tar to be supplied to burner 54. A suitable pilot or ignition device (not shown) immediately ignites the fuel which burns in the combustion chamber 19 and which supplies temporary, deficiency-make-up heat to the waste heat boiler through valve 51 which is now open. The gases of combustion from auxiliary furnace 18 pass down passage 22, up passage 23, out through valve 37 and flue 38.

Thus a gas generating system using a waste heat boiler is provided in which the waste heat boiler has a continuous supply of heat resulting in a continuous generation of steam. Obviously, with a continuous supply of heat the boiler can operate much more efficiently and greater use can be made of the steam obtained from the waste heat boiler. It will be understood that the separate pieces of apparatus shown may be of standard construction and that the parts which are exposed to intense heat will be suitably protected by water cooling or fire brick or other means old and well known in the art.

While certain novel features of the invention have been shown and described and are pointed out in the annexed claim, it will be understood that various omissions, substitutions and changes may be made by those skilled in the art without departing from the spirit of the invention.

What is claimed is:

The method of operating a water gas set which includes a generator containing a bed of fuel therein, a single waste heat steam generating boiler connected with the said water gas set, and an auxiliary furnace having a fluid fuel fired burner therein, said furnace being arranged to supply products of combustion to said single waste heat steam generating boiler, which process comprises blasting the fuel bed with air and passing the resultant blast gases through the said single waste heat boiler to generate steam and alternately passing steam through said fuel bed to make water gas, withdrawing the resultant water gas from the water gas set without passing the same through the said waste heat steam generating boiler and simultaneously with the passage of the steam through the fuel bed, burning fluid fuel in said auxiliary furnace and passing the resultant products of combustion through the said waste heat steam generating boiler, thereby continuously generating steam in the said single waste heat steam generating boiler in amount at least equal to the amount of steam required by the water gas set.

GEORGE H. MAGEE.